Patented July 18, 1950

2,515,878

UNITED STATES PATENT OFFICE 2,515,878

ARYLAMINOMETHINE COMPOUNDS

Edward B. Knott, Harrow Wealdstone, England, assignor to Eastman Kodak Company, Rochester, N. Y., a corporation of New Jersey No Drawing. Application October 26, 1946, Serial No. 706,053. In Great Britain January 19, 1946

5 Claims. (Cl. 260—240)

This invention relates to arylaminomethine compounds and to a process for preparing the same.

It is known that certain arylaminomethine compounds can be prepared by condensing cyclic compounds having an intracyclic ketomethylene group with diarylformamidines. Thus, 5-anilinomethylene-3-ethylrhodanine and 4-anilinomethylene-3-methyl-1-phenyl-5-pyrazolone can be prepared by condensing 3-ethylrhodanine or 3-methyl-1-phenyl-5-pyrazolone with diphenylformamidine. See Dains et al.,—J. Am. Chem. Soc. 31, 1153 (1909); 35, 959 (1913); 38, 1841 (1916); 40, 562 (1918) and 44, 2310 (1922).

I have now found that arylaminomethine compounds can be prepared by condensing cyclic compounds having an intracyclic ketomethylene group with alkylisoformanilides. Not only do the alkylisoformanilides condense with such cyclic compounds to give arylaminomethine compounds, but higher yields and purer products are obtained than in the diarylformamidine process. This may be owing to the fact that an amine is liberated in the diarylformamidine process and the amine may have a detrimental effect. In my new process, an alcohol is liberated during the process.

It is, accordingly, an object of my invention to provide an improved process for preparing arylaminomethine compounds. A further object is to provide arylaminomethine compounds. Other objects will become apparent hereinafter.

In accordance with my invention, I prepare arylaminomethine compounds by condensing an alkylisoformanilide (i. e. a N-arylformimino ether) with a cyclic compound containing from 5 to 6 atoms in the cyclic nucleus and containing an intracyclic ketomethylene group (—CH$_2$—CO—) or thioketomethylene group (—CH$_2$—CS—). I have also found that anils can be prepared by condensing an alkylisoformanilide with polycyclic phenols in which at least one of the positions ortho and para to the phenolic hydroxyl group is not substituted, i. e. a polycyclic phenol containing a —CH= group in one or both of the positions ortho and para to the phenolic hydroxyl group.

The alkylisoformanilides which I employ in practicing my invention can be represented by the following general formula:

I.

$$R_1—N=CH—OR_2$$

wherein $R_1$ represents an aryl group (substituted or unsubstituted), e. g. phenyl, p-chlorophenyl, p-methoxyphenyl, α-naphthyl, β-naphthyl, etc. and $R_2$ represents an alkyl group (substituted or unsubstituted), e. g. methyl, ethyl, n-propyl, isobutyl, n-butyl, β-ethoxyethyl, allyl, benzyl, etc.

The cyclic compounds containing the intracyclic ketomethylene group can be represented by the following general formula:

II.

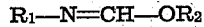

$$H_2C\!-\!-\!-\!C\!=\!Q$$

wherein Q represents an oxygen or a sulfur atom and X represents the non-metallic atoms necessary to complete a cyclic nucleus containing from 5 to 6 atoms in the ring.

Typical compounds represented by the above general Formula II are: thiazolones (such as isothiohydantoin), thiazolidones (e. g. 4-thiazolidone), thiothiazoledione (e. g. 2-thio-2,4(3,5)-thiazoledione, dithiothiazolediones (e. g. 2,4-dithio-2,4(3,5)-thiazolediones, i. e. thiorhodanines), barbituric acids, thiobarbituric acids, oxazolones, thio-oxazoledione (e. g. 2-thio-2,4(3,5)-oxazoledione), iminazolones, iminazolediones (hydantoins) e. g. 2-thio-2,4(3,5)-iminazolidione, oxydihydroquinoxalines, dihydrocarbostyrils, coumarones, oxindoles, ketodihydrobenzparathiazines, homophthalimide, succinimide, indandione, tetronic acid, ketodihydrothionaphthenes (e. g. thioxindoxyl), indoxyl, benzomorpholones, 2,4-dihydroxyquinoline (4-hydroxycarbostyril) etc.

The polycyclic phenols which I employ in practicing my invention can be represented by the following general formula:

III.

$$HO—C=(C—C)_{n-1}=CH$$
$$\phantom{HO—C=(}|\phantom{C—}|$$
$$\phantom{HO—C=(}R_3\phantom{—C}R_4$$

wherein $R_3$ and $R_4$ represent a hydrogen atom or a monovalent organic radical and $n$ represents a positive integer of from 1 to 2, and D represents the non-metallic atoms necessary to complete a carbocyclic or heterocyclic nucleus.

Typical polycyclic phenols represented by the above general Formula III are: β-naphthol, α-naphthol, anthranol, 4'-hydroxy-2-methylnaphtha-1':2',4:5-thiazole, 2-phenanthrol, etc.

The condensations of the alkylisoformanilides with the compounds containing the intracyclic ketomethylene or thioketomethylene group can be carried out by heating, with or without a solvent, advantageously at 100 to 200° C. Certain of the 5-pyrazolones condense with the alkylisoformanilides readily on a steam bath while other ketomethylene compounds require fusion at 120 to 180° C. or higher.

In the case of condensations of the polycyclic phenols with alkylisoformanilides, the condensations are best carried out by fusion at an elevated temperature, advantageously between 100 and 200° C. For this condensation, it is not necessary to commence with the N-arylformimino ether (alkylisoformanilide) since, if the condensation is carried out at 120° C. or above, the N-arylformimino ether can be formed in situ. Thus, for example, the polycyclic phenol can be fused with a mixture of a primary aromatic amine (e. g. aniline, p-chloroaniline, p-methoxyaniline, etc.), and an excess of an alkyl orthoformate (e. g. ethyl orthoformate, n-propyl orthoformate, n-butyl orthoformate, isobutyl orthoformate, etc.) or a diarylformamidine (diphenylformamidine, etc.) and an alkyl orthoformate. Both of the aforesaid mixtures give the N-arylformimino ether in situ, as shown by Claisen, Ann. 287, 365 (1895).

Polycyclic phenols containing both a free ortho and para position will usually give rise to a mixture of anils. Monocyclic phenols do not condense readily and phenol, itself, not at all. β-naphthols containing a substituent in the 1-position do not condense, but these substances are not polycyclic phenols in which at least one of the positions ortho and para to the phenolic hydroxyl group is unsubstituted.

The following examples will serve to illustrate further the manner of practicing my invention.

*Example 1.—4-anilinomethine-3-methyl-1-phenyl-5-pyrazolone*

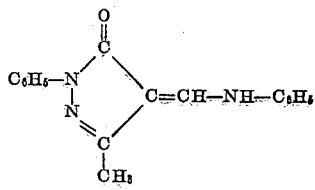

3-methyl-1-phenyl-5-pyrazolone (4.35 g.) and ethylisoformanilide (3.75 g.) were fused on the steam bath for 5 minutes in a flask. Ethyl alcohol boiled off and the contents of the flask solidified. The contents of the flask were recrystallized from ethyl alcohol and the anilinomethine compound was obtained as yellow needles, melting at 154° C.

*Example 2.—5-anilinomethine-3-ethyl-4-keto-2-thiotetrahydro-oxazole*

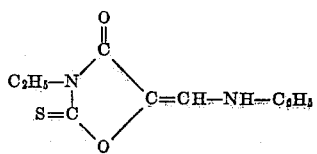

3-ethyl-4-keto-2-thiotetrahydro-oxazole(3-ethyl-2-thio-2,4(3,5)-oxazoledione) (1.45 g.) and ethylisoformanilide (1.5 g.) were fused for 30 minutes at 150° C. Ethyl alcohol was evolved and crystals of the anilinomethine compound formed. After cooling the solid anilinomethine compound was recrystallized from ethyl alcohol in which it is sparingly soluble, thus forming pale yellow needles which melted at 235° C.

*Example 3.—(2-hydroxy-1-naphthylidene) aniline*

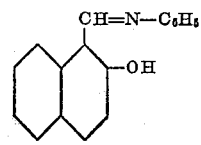

β-Naphthol (14.4 g.) and ethylisoformanilide (14.9 g.) were fused at 160° C. for 30 minutes at the end of which time the evolution of ethyl alcohol had ceased. Methyl alcohol (5 cc.) was added to the melt which was then chilled. Yellow plates (17 g.) of the naphthylidene compound crystallized. Recrystallized from methanol, the naphthylidene compound melted at 92° C.

*Example 3a.—(2-hydroxy-1-naphthylidene) aniline*

β-Naphthol (14.4 g.), diphenylformamidine (4 g.) and ethyl orthoformate (3 g.) were fused at 150° C. for 30 minutes and then at 160° C. for 30 minutes. On cooling the yellow oil was shaken with light petroleum ether which caused complete solidification. From methyl alcohol the naphthylidene compound formed yellow plates which melted at 92° C.

*Example 4.—2-hydroxy-1-naphthylidene-p-anisidine*

β-Naphthol (5.76 g.), ethyl orthoformate (5.92 g.) and p-anisidine (4.92 g.) were fused at 150° C. for 60 minutes. A little methyl alcohol was added to the cooled melt; on scratching the whole solidified. From methyl alcohol the naphthylidene compound was obtained as bright yellow needles melting at 111° C.

*Example 5.—9-hydroxy-10-anthrylidineaniline*

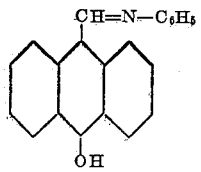

Anthranol (anthrone) (3.48 g.) and ethylisoformanilide (3 g.) were fused at 180° C. for 60 minutes. Ethyl alcohol (10 cc.) was added to the orange red melt and the whole was chilled. A crystalline solid (4.9 g.) separated. From acetic acid, the anthraniline compound formed garnet red crystals, melting at 204° C. Its sodium salt gave a brilliant red solution.

9-hydroxy-10-anthraldehyde was obtained by dissolving the above anil (2 g.) in boiling acetic acid (20 cc.) and adding concentrated hydrochloric acid (4 cc.). A brilliant red color developed which quickly faded; on cooling colorless crystals of the aldehyde were deposited. From benzene they formed creamy flat needles, melting at 230° C. onward.

*Example 6.—4'-hydroxy-2-methylnaphtha-1',2',4,5-thiazole-3'-aldehyde Anil.*

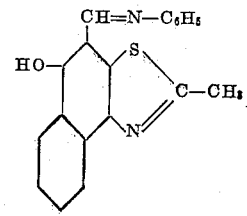

4'-hydroxy-2-methylnaphtha-1',2',4,5-thiazole (10.95 g.) and ethylisoformanilide (15 g.) were fused at 170° C. for 60 minutes. On cooling the deep orange melt solidified. It was ground with ethyl alcohol, collected on a filter and washed with ethyl alcohol (13.2 g.). From benzene the anil was obtained as orange needles melting at 228° C.

The corresponding aldehyde was obtained as in the previous Example 5, using 1,4-dioxane as a solvent instead of acetice acid. From ethyl alcohol, the aldehyde was obtained as greenish needles melting at 160° C. The aldehyde had the following formula:

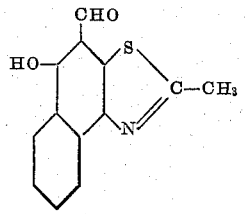

Any of the anils obtained, in accordance with my invention, can be hydrolyzed to give the corresponding aldehyde as shown above. The anils can be employed in rubber compounding.

In the same manner shown in the foregoing examples, other of the ketomethylene compounds and polycyclic phenols can be condensed with alkylisoformanilides.

The 4'-hydroxy-2-methylnaphtha-1', 2',4,5-thiazole employed above can be prepared as described in my copending application Serial No. 584,736, filed March 24, 1945 (now United States Patent 2,476,669, dated July 19, 1949).

What I claim as my invention and desire to be secured by Letters Patent of the United States is:

1. A process for preparing an arylaminomethine compound comprising condensing, at a temperature of from 100 to 200° C., an alkylisoformanilide selected from those represented by the following general formula:

$$R_1-N=CH-OR_2$$

wherein $R_1$ represents an aryl group selected from the group consisting of aryl groups of the benzene series and aryl groups of the naphthalene series, and $R_2$ represents an alkyl group containing from 1 to 7 carbon atoms, with a nitrogen heterocyclic ketomethylene compound selected from those represented by the following general formula:

wherein X represents the non-metallic atoms necessary to complete a heterocyclic compound selected from the group consisting of 4-keto-2-thiotetrahydro-oxazoles and 5-pyrazolones.

2. A process for preparing an arylaminomethine compound comprising condensing, at a temperature of from 120 to 180° C., an alkylisoformanilide in which the alkyl group is a primary alkyl group containing from 1 to 4 carbon atoms with a 4-keto-2-thiotetrahydro-oxazole.

3. A process for preparing an arylaminomethine compound comprising condensing, at a temperature of from 120 to 180° C., ethylisoformanilide with 3-ethyl-4-keto-2-thiotetrahydro-oxazole.

4. A process for preparing an arylaminomethine compound comprising condensing, at a temperature of 100 to 200° C., an alkylisoformanilide in which the alkyl group is a primary alkyl group containing from 1 to 4 carbon atoms with a 5-pyrazolone.

5. A process for preparing an arylaminomethine compound comprising condensing, at a temperature of 100 to 200° C., ethylisoformanilide with 3-methyl-1-phenyl-5-pyrazolone.

EDWARD B. KNOTT.

REFERENCES CITED

The following references are of record in the file of this patent:

UNITED STATES PATENTS

| Number | Name | Date |
|---|---|---|
| 2,165,339 | Brooker | July 11, 1939 |
| 2,241,238 | Brooker | May 6, 1941 |

FOREIGN PATENTS

| Number | Country | Date |
|---|---|---|
| 334,706 | Great Britain | Sept. 11, 1930 |
| 404,997 | Great Britain | Jan. 22, 1934 |
| 412,309 | Great Britain | June 28, 1934 |
| 432,628 | Great Britain | July 23, 1935 |